United States Patent
Stuck et al.

(10) Patent No.: US 10,343,451 B2
(45) Date of Patent: Jul. 9, 2019

(54) ANTI-ROLL OFF ASSEMBLY AND SYSTEM INCLUDING SAME

(71) Applicant: Hutchinson Industries, Inc., Trenton, NJ (US)

(72) Inventors: Larry W. Stuck, Amherst, NY (US); Daniel Skoczylas, Cheektowaga, NY (US); Colin G. Vogel, Cheektowaga, NY (US)

(73) Assignee: HUTCHINSON INDUSTRIES, INC., Trenton, NJ (US)

( * ) Notice: Subject to any disclaimer, the term of this patent is extended or adjusted under 35 U.S.C. 154(b) by 195 days.

(21) Appl. No.: 15/459,718

(22) Filed: Mar. 15, 2017

(65) Prior Publication Data

US 2018/0264878 A1 Sep. 20, 2018

(51) Int. Cl.
*B60B 21/12* (2006.01)
*B60B 3/00* (2006.01)

(52) U.S. Cl.
CPC ............. *B60B 21/12* (2013.01); *B60B 3/00* (2013.01); *B60B 2900/523* (2013.01)

(58) Field of Classification Search
CPC ...... B60B 21/12; B60B 3/00; B60B 2900/523
USPC ........................................................ 152/379
See application file for complete search history.

(56) References Cited

U.S. PATENT DOCUMENTS

| | | | |
|---|---|---|---|
| 4,694,874 A | 9/1987 | White | |
| 5,435,368 A | 7/1995 | Lust | |
| 6,698,481 B1 | 3/2004 | Marin | |
| 7,469,732 B2 | 12/2008 | Heuze et al. | |
| 7,730,918 B2 * | 6/2010 | Malevergne | B60B 21/023 152/379.5 |
| 8,627,866 B2 * | 1/2014 | Mani | B60B 21/102 152/379.5 |
| 2008/0164691 A1 | 7/2008 | Meinig | |
| 2008/0210375 A1 * | 9/2008 | Dershem | C07C 69/60 156/332 |
| 2011/0030869 A1 | 2/2011 | Marsaly et al. | |

OTHER PUBLICATIONS

International Search Report and Written Opinion for International Application No. PCT/US2017/022505, dated Jul. 19, 2017 (21 pages).

* cited by examiner

*Primary Examiner* — S. Joseph Morano
*Assistant Examiner* — Jean W Charleston
(74) *Attorney, Agent, or Firm* — K&L Gates LLP

(57) ABSTRACT

A system. The system includes a one-piece wheel, a tire mounted to the wheel, and an antiroll off assembly. The wheel defines an axis of rotation and includes a disc portion which defines a central opening, and a rim portion which is connected to the disc portion and defines first and second flange portions, first and second seat portions and a well portion. The anti-roll off assembly is positioned in the well portion and includes a band, a plurality of filler assemblies connected to the band and a coupler assembly configured to adjust a tension force applied to the band. The coupler assembly includes a first trunnion in contact with the band and having a first threaded opening, a second trunnion in contact with the band and having a second threaded opening, and a threaded member threadedly engaged with the first threaded opening and the second threaded opening.

15 Claims, 17 Drawing Sheets

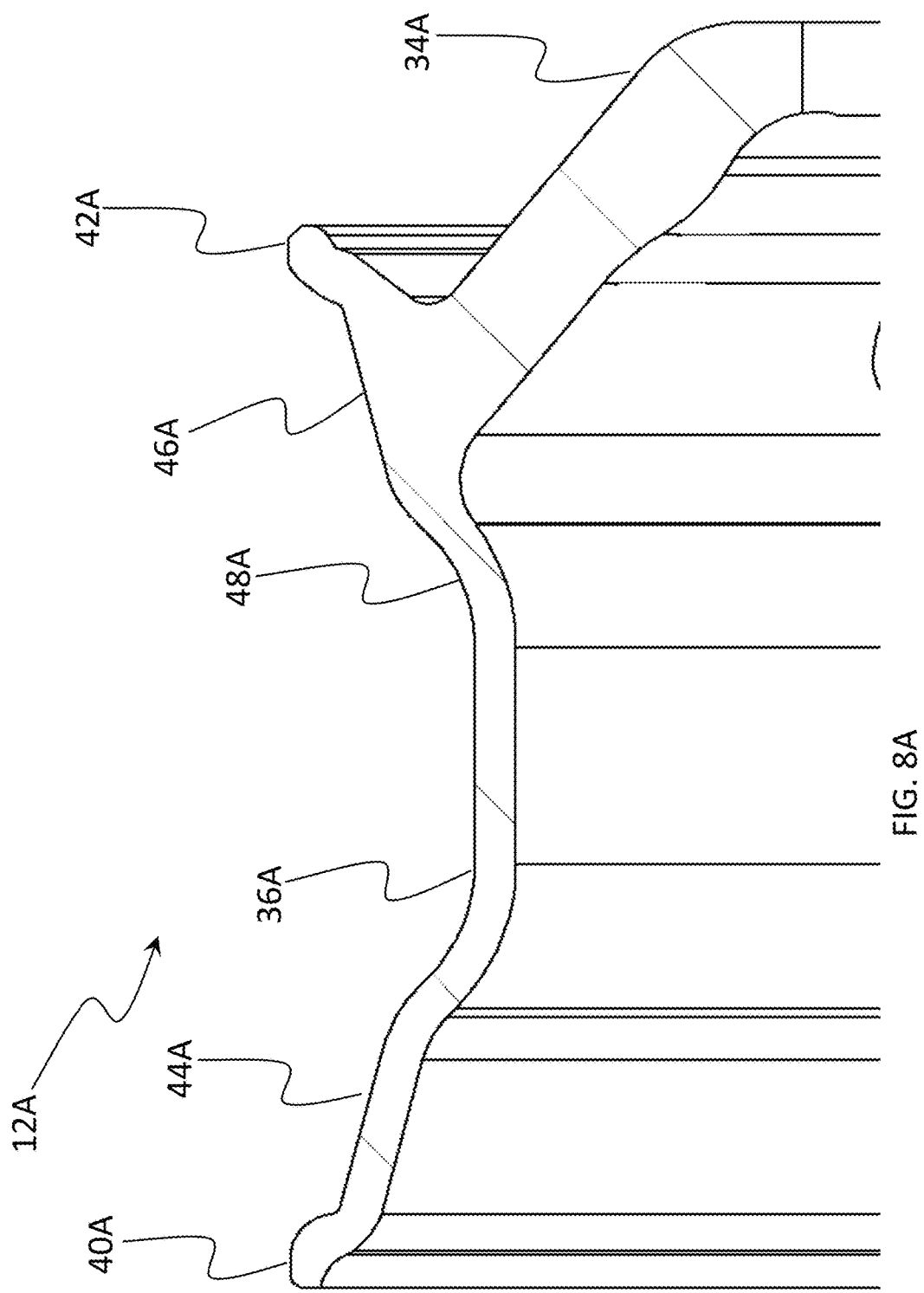

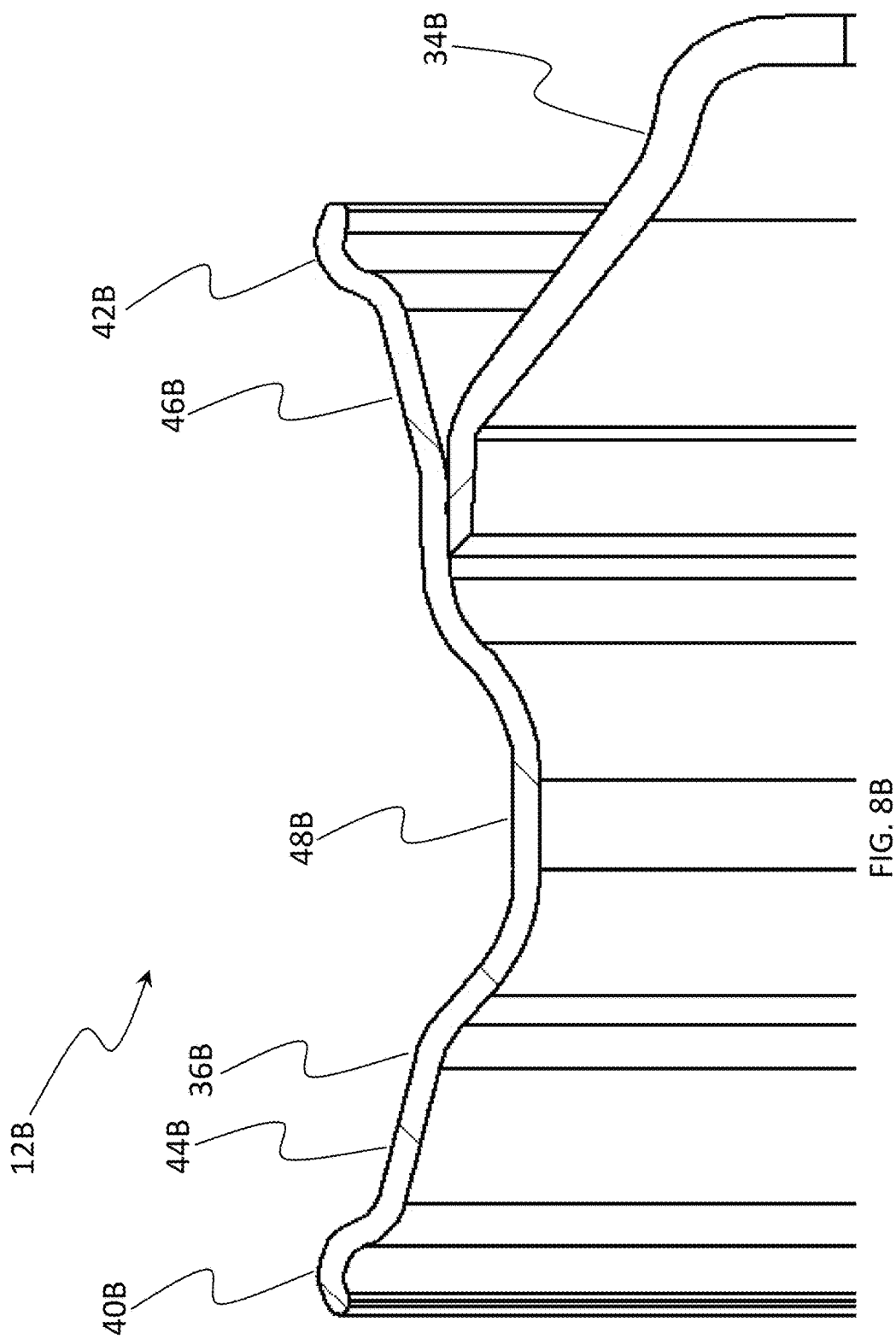

ANTI-ROLL OFF ASSEMBLY AND SYSTEM INCLUDING SAME

BACKGROUND

This application discloses an invention which is related, generally and in various aspects, to an anti-roll off assembly and a system including the same for preventing a tire mounted on a one-piece wheel from rolling off the wheel.

Many solid one-piece wheels include a disc portion and a rim portion. The disc portion is connectable to the hub of the vehicle. The rim portion is connected to the disc portion and includes a first flange portion, a second flange portion, a first seat portion, a second seat portion and a drop center portion. The first flange portion is at an axially outboard side of the rim portion and the second flange portion is at an axially inboard side of the rim portion. The first seat portion is axially inward from the first flange portion and the second seat portion is axially inward from the second flange portion. The drop center portion is positioned between the first and second seat portions and generally includes a bottom portion, a first side portion and a second side portion. The bottom portion of the drop center portion of the rim portion of the wheel has a smaller radial diameter than the first and second seat portions. In other words, the radial distance the drop center portion is from an axis of rotation of the wheel is less than the radial distance the first and second seat portions are from the axis of rotation of the wheel.

The smaller radial diameter of the drop center portion allows for a tire to be more easily mounted to the rim portion of the wheel. For example, a bead portion of a tire may be forcedly distorted so as to pass over one of the flange portions. Once this bead portion of the tire is passed over the one of the flange portions, the bead portion of the tire can then be dropped into the drop center portion. Once this bead portion of the tire is positioned in the drop center portion, the opposite bead portion of the tire can then also be easily passed over the one of the flange portions. Thus, the entire circumference of both tire bead portions may be passed over the one of the flange portions, step-by-step working around the circumference of the tire, until both bead portions are mounted to the rim portion. Upon pressurizing the inside of the tire, by use of a tire valve, both bead portions of the tire will be respectively forced axially outward so as to seat snugly upon the first and second seat portions and pressed axially outward against the flange portions.

Although the above arrangement allows a tire to be more easily mounted to the rim portion of a wheel, it also can make it easier for a tire to roll off the rim portion of the wheel while the vehicle is moving (and the wheel connected to the vehicle is rotating), especially in low tire pressure situations, flat tire situations and high speed cornering situations.

One approach to minimize the chance of tire roll-off occurring is to position a device circumferentially around the base of the drop center portion so as to partially fill the drop center portion. An example of such a device is disclosed in U.S. Pat. No. 7,469,732, the content of which is hereby incorporated in its entirety. Although such prior art devices are generally effective for wheels and tires utilized by automobiles and light-duty trucks, there are multiple reasons why such devices are generally not suitable for more demanding applications like commercial truck or bus applications.

For example, one reason is that commercial truck or bus applications require an increased band tensioning force capability over that of the device disclosed in U.S. Pat. No. 7,469,732. For that device, the belt loop attachment at each end of the belt is clamped together and spot welded without a formed radius at the vertex of the transition as shown in FIG. 1. As a result, the tensioning force capability of the belt of the device is significantly less than what is required in a typical commercial truck or bus application. More specifically, the band tensioning force ($F_T$) created by the connecting means which connect the belt loops to one another creates a resultant force ($F_R$) on the upper portion of the belt loop. The spot welds are then subject to destructive peel load forces ($F_P$) from the vertical component created by the resultant force ($F_R$), effectively reducing the tensioning force capability of the belt to an amount which is significantly less than what is required in a typical commercial truck or bus application.

Also, the connecting means which connect the respective belt loops to one another for that device requires a belt tightening nut positioned within one of the belt loops as shown in FIG. 2. In order to have the tightening nut positioned within one of the belt loops, a hardware clearance HC is provided within the belt as shown in FIG. 3. In various aspects, the required hardware clearance can consume up to 75% of the width of the belt. With such a relatively large amount of the width consumed by the hardware clearance HC, the tensioning force capability of the belt is generally significantly less than what is required in a typical commercial truck or bus application.

Additionally, the connection between the respective filling elements and the belt can become compromised when the belt is subjected to higher tensioning forces such as those utilized in many commercial truck or bus applications. When the connections become compromised, the spacings between adjacent filling elements can become non-uniform, the filling elements can lose their position within the drop center portion of the rim, and the device can ultimately lose its intended functionality (preventing the tire from rolling off the wheel).

Furthermore, for certain aspects of the device disclosed in U.S. Pat. No. 7,469,732, the respective filling elements can be adjusted radially and/or axially to meet the radial height and/or axial width of the drop center portion of the rim. However, for a given filling element, the adjustable structure and arrangement required to do so does not necessarily completely fill and/or block off the volume of the drop center portion of the rim associated with the given filling element. By the filling elements not completely filling and/or blocking off the volume of the drop center portion of the rim associated with the filling elements, the filling elements can sometimes move axially or radially within the drop center portion. Whenever this movement occurs, the device may not (1) adequately ensure that the bead portion of the tire does not enter the drop center portion of the rim and allow the tire to roll off the wheel and (2) be able to support the heavy loads generally associated with commercial truck or bus applications.

Another example of why such a device is not suitable for more demanding applications like commercial truck or bus applications is that the two belt loops at the ends of the belt are formed over respective transverse bars as shown in FIG. 4. With this structure and arrangement, the belt loops can slide laterally off of the transverse bars if there is any transverse bar misalignment during the device tightening process. This is especially so in typical commercial truck or bus applications where greater tensioning forces are applied to the belt. Of course, if a belt loop slides laterally off its corresponding transverse bar, the intended functionality of the device may be defeated (preventing the tire from rolling off the wheel).

Yet another example of why such a device is not suitable for more demanding applications like commercial truck or bus applications is that the connecting means which connect the respective belt loops to one another is a single sided fastener (See FIG. 5). The single sided fastener includes a sheath which has a first end which terminates in one of the transverse bars, a T-shaped rod which is positioned within the sheath and has a first end which terminates in the other one of the transverse bars, and the belt tightening nut threadedly mounted on a second end of the T-shaped rod and against a second end of the sheath). As the belt tightening nut is rotated in a first direction, the transverse bars are pulled toward one another, thereby tightening the belt around the rim portion of the wheel. As the belt tightening nut is rotated in a second direction which is opposite the first direction, the transverse bars are pushed away from one another, thereby loosening the belt around the rim portion of the wheel. By only utilizing a single sided fastener, the time required to tension the belt of the device is relatively slow. The relatively long time required to tension the belt has a relatively high cost associated therewith, thereby effectively rending the device not economically feasible for many commercial truck or bus operations.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

FIG. 8A illustrates various aspects of a wheel of the system of FIG. 6;

FIG. 8B illustrates other aspects of a wheel of the system of FIG. 6;

DETAILED DESCRIPTION

Figure 1:
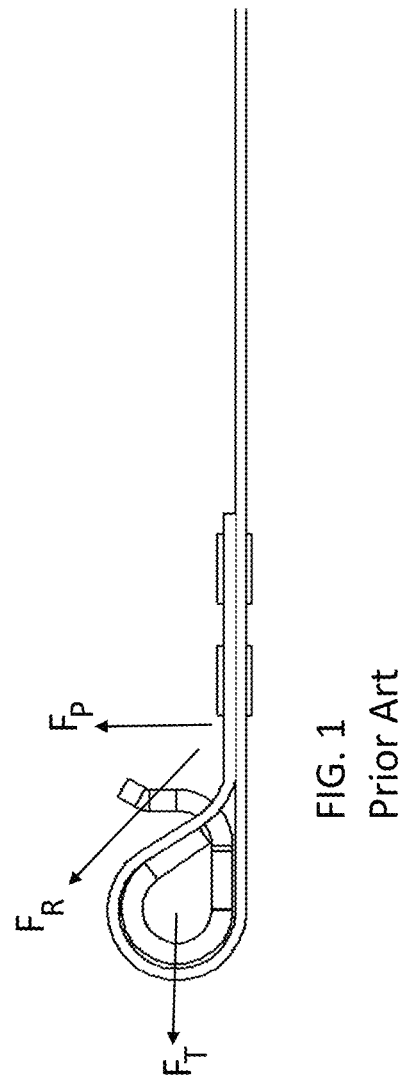
FIG. 1 illustrates various aspects of a belt loop attachment of a prior art device.
Figure 2:
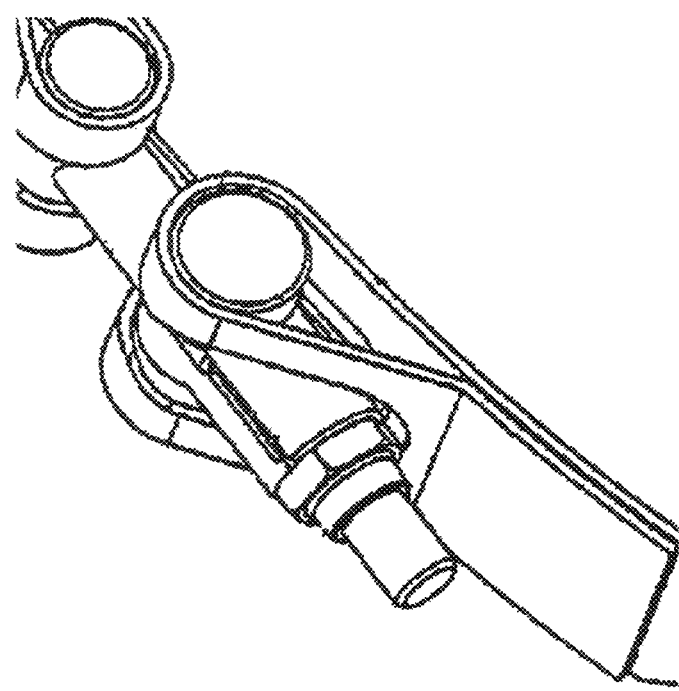
FIG. 2 illustrates various aspects of a connecting means of the prior art device of FIG. 1.
Figure 3:
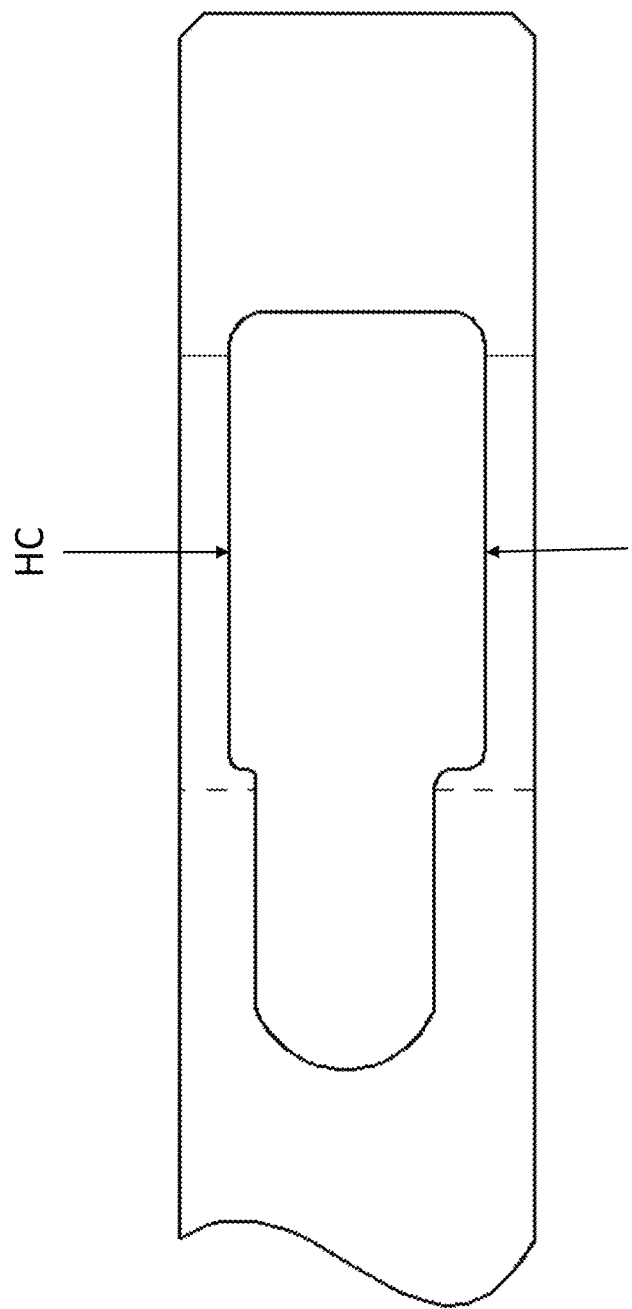
FIG. 3 illustrates various aspects of a belt loop of the prior art device of FIG. 1.
Figure 4:
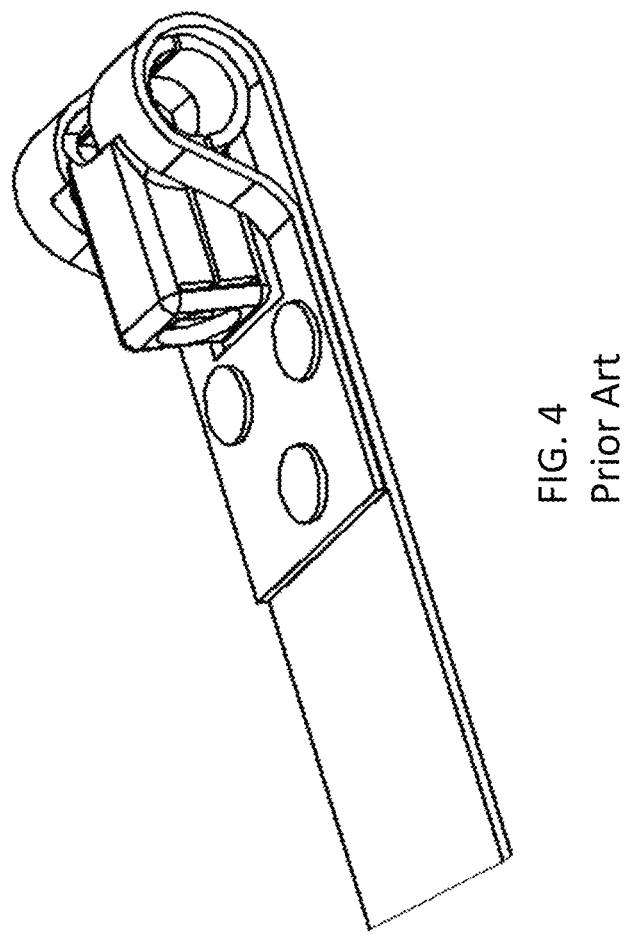
FIG. 4 illustrates various aspects of a belt loop/connecting means arrangement of the prior art device of FIG. 1.
Figure 5:
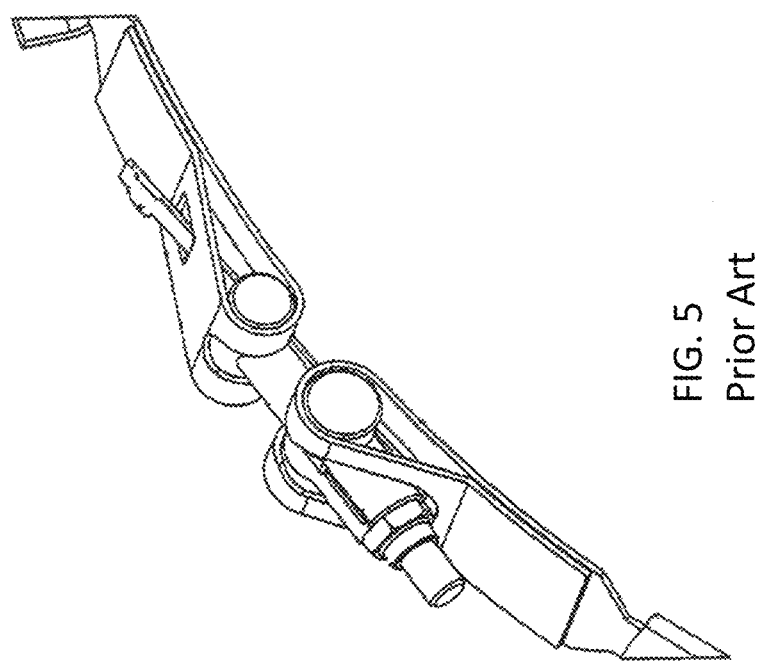
FIG. 5 illustrates various aspects of a single sided fastener of the prior art device of FIG. 1.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the anti-roll off assembly and system in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the anti-roll off assembly and system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, below, left, right, interior, exterior, axially, radially and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 6:
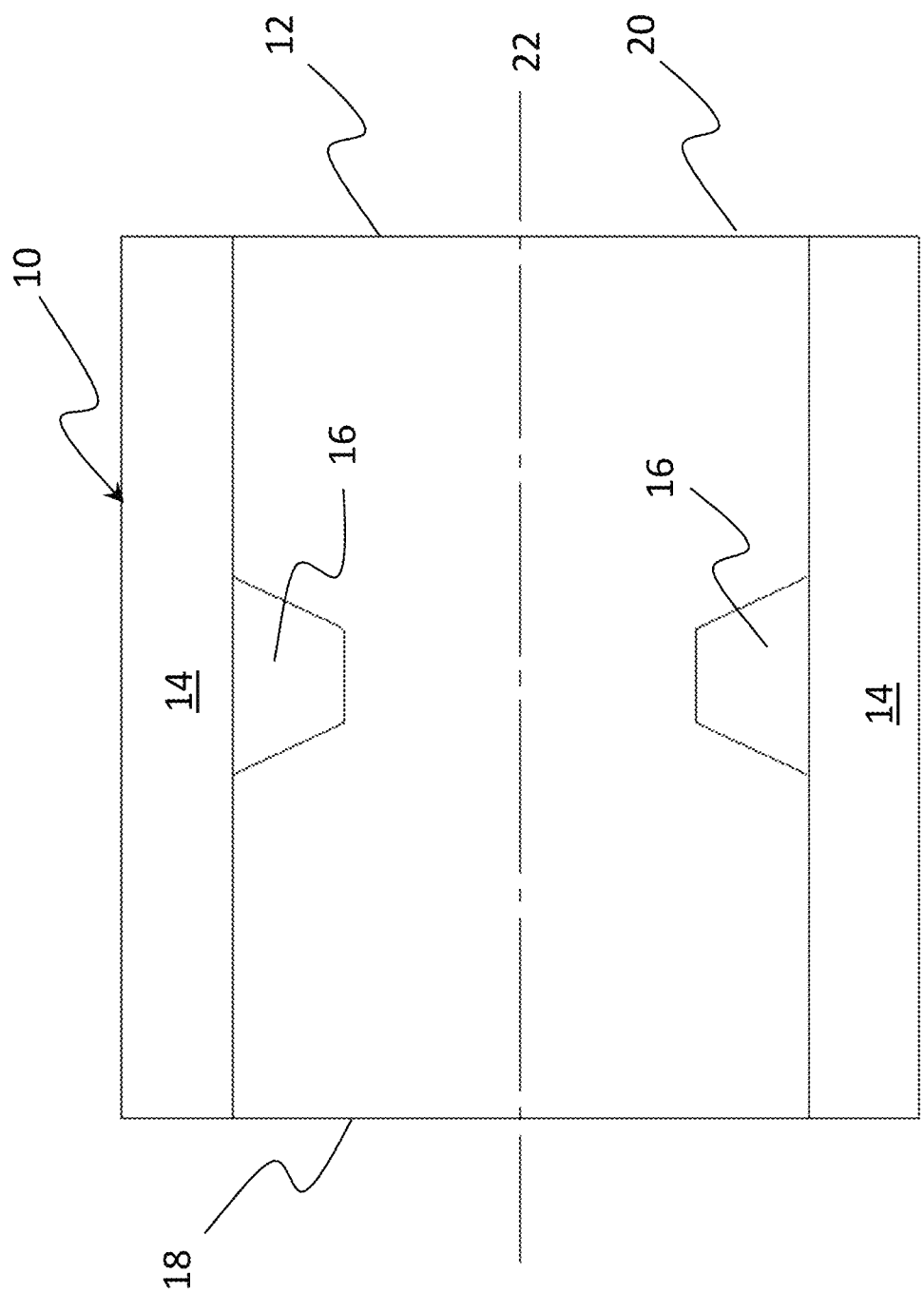
FIG. 6 illustrates a high-level representation of a system according to various aspects.

FIG. 6 illustrates a high-level representation of a system 10 according to various aspects. The system 10 may be utilized with a commercial truck and/or bus and includes a one-piece wheel 12, a tire 14 mounted on the wheel 12, and an anti-roll-off assembly 16. The wheel 12 includes an outboard side 18 and an inboard side 20, and defines an axis of rotation 22 which extends axially between the outboard side 18 of the wheel 12 and the inboard side 20 of the wheel 12. The tire 14 is positioned radially outward from the axis of rotation 22. The anti-roll off assembly 16 is also positioned radially outward from the axis of rotation 22. As explained in more detail below, the system 10 is configured to prevent the tire 14 from rolling off the wheel 12 and is suitable for use in commercial truck and bus applications.

Figure 7:
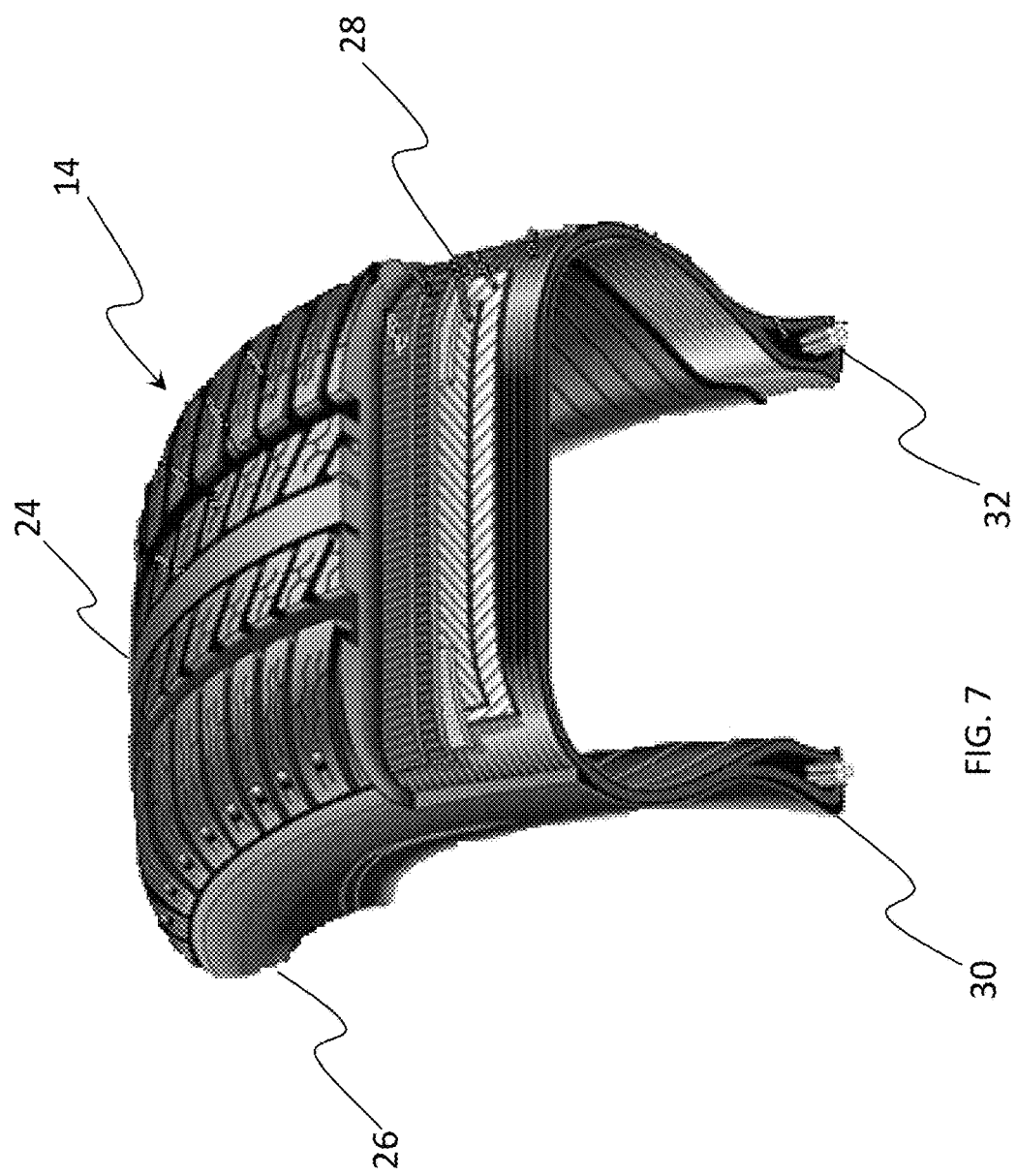
FIG. 7 illustrates various aspects of a tire of the system of FIG. 6.

FIG. 7 illustrates various aspects of the tire 14. The tire 14 is suitable for use with a commercial truck and/or bus and includes a tread portion 24, a first sidewall portion 26, a second sidewall portion 28, a first bead portion 30 and a second bead portion 32. According to various aspects, the first sidewall portion 26 and the first bead portion 30 are considered as the outboard side of the tire 14, and the second sidewall portion 28 and the second bead portion 32 are considered as the inboard side of the tire 14.

The wheel 12 is suitable for use with a commercial truck and/or bus and may be fabricated from any suitable material. For example, according to various aspects, the wheel 12 includes a metal such as aluminum, an alloy such as steel, a composite, etc. FIG. 8A illustrates various aspects of an aluminum one-piece wheel 12A. The wheel 12A includes a disc portion 34A and a rim portion 36A. The disc portion 34A is configured to be connected to a hub of a vehicle (not shown for purposes of clarity), defines a central opening 38A (not shown) which surrounds the axis of rotation 22, and extends from the central opening 38A to the rim portion 36A. The rim portion 36A is connected to (or integral with) the disc portion 34A and includes a first flange portion 40A, a second flange portion 42A, a first seat portion 44A, a second seat portion 46A and a well portion 48A. According to various aspects, the first flange portion 40A is positioned at the outboard side 18 of the wheel 12A and the second flange portion 42A is positioned at the inboard side 20 of the wheel 12A. The first seat portion 44A is adjacent and axially inward from the first flange portion 40A. After the tire 14 is mounted on the wheel 12A, as the tire 14 is pressurized the first bead portion 30 of the tire 14 is pushed axially outwards towards the first seat portion 44A and is eventually pressed against the first seat portion 44A. For purposes of clarity, the tire 14 is not shown in FIG. 8A.

Similarly, the second seat portion 46A is adjacent and axially inward from the second flange portion 42A. After the tire 14 is mounted on the wheel 12A, as the tire 14 is pressurized the second bead portion 32 of the tire 14 is pushed axially outwards towards the second seat portion 46A and is eventually pressed against the second seat portion 46A. It will be appreciated that once the tire 14 is pressurized, the first sidewall portion 26 of the tire 14 is pressed against the first flange portion 40A of the wheel 12A and the second sidewall portion 28 of the tire 14 is pressed against the second flange portion 42A of the wheel.

The well portion 48A is positioned axially between the first and second seat portions 44A, 46A, defines a height (e.g., the radial distance between the bottom/radially innermost surface of the well portion 48A and the bottom/radially innermost surface of the first and/or second seat portions 44A, 46A), and defines a width (e.g., the minimum axial distance between the first and second seat portions 44A, 46A). According to various aspects, the well portion 48A may be axially equidistant between the first and second seat portions 44A, 46A (a symmetric rim portion 36). According to other aspects, the well portion 48A may be axially closer to one of the first and second seat portions 44A, 46A than the other of the first and second seat portions 44A, 46A (an asymmetric rim portion 36A). For example, according to various aspects, the well portion 48A may be positioned axially closer to the outboard side 18 of the aluminum one-piece wheel 12A.

FIG. 8B illustrates various aspects of a steel one-piece wheel 12B. Although the steel one-piece wheel 12B is similar to the aluminum one-piece wheel 12A, the exact profile of the steel one-piece wheel 12B, including the well portion 48B, is different from that of the aluminum one-piece wheel 12A. It will also be appreciated that according to various embodiments, due to the differences in the profiles of the respective well portions 48A, 48B, the profile of a given anti-roll off assembly 16 utilized with the aluminum one-piece wheel 12A can be slightly different from the profile of a given anti-roll-off assembly 16 utilized with the steel one-piece wheel 12B. For purposes of simplicity, the well portion 48A or the well portion 48B may be generically referred to hereinafter as the well portion 48.

Figure 9:
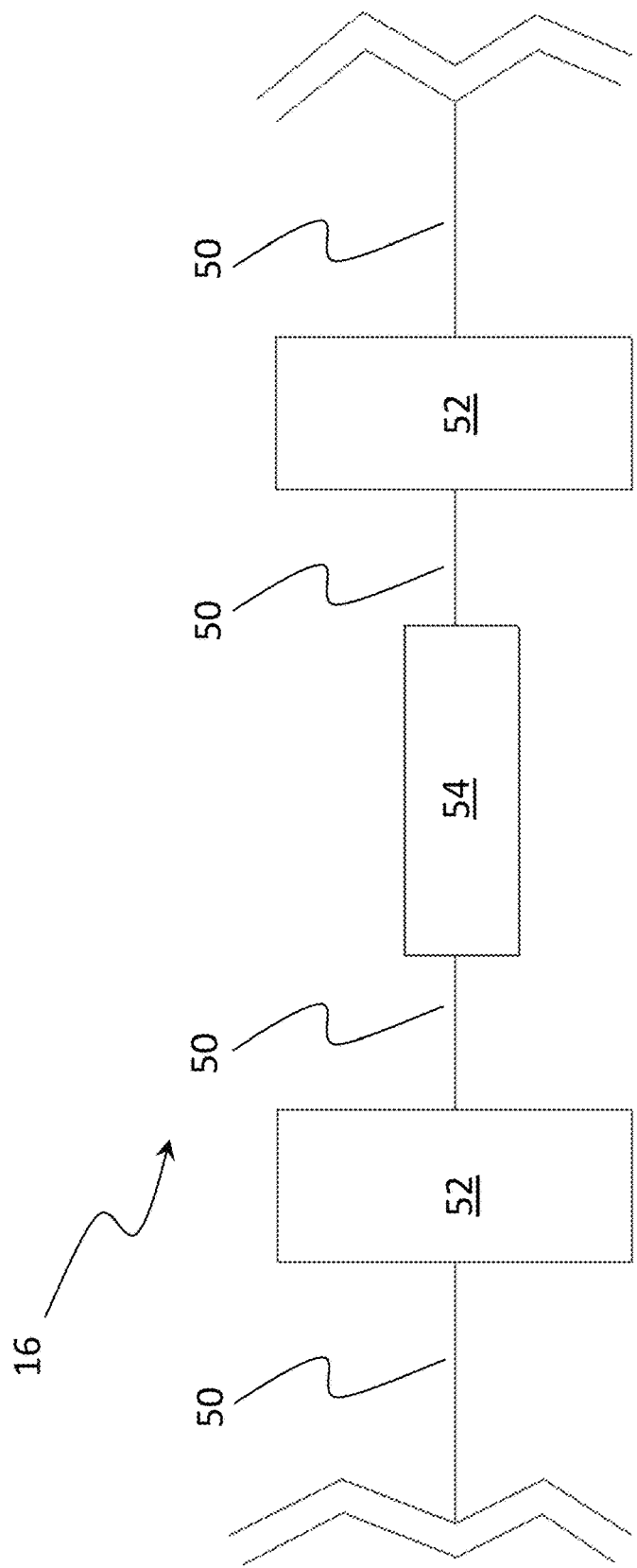
FIG. 9 illustrates a high-level representation of an anti-roll off assembly of the system of FIG. 6 according to various aspects.

FIG. 9 illustrates a high level representation of the anti-roll off assembly 16. The anti-roll off assembly 16 is configured to extend around the entire circumference of the well portion 48 of the wheel 12 and to prevent the tire 14 from rolling off the wheel 12. The anti-roll off assembly 16 includes a band 50, a plurality of filler assemblies 52 and a coupler assembly 54. The band 50 may be any suitable type of band. For example, according to various aspects the band 50 includes a metallic material (e.g., a stainless steel material), a polymeric material, combinations thereof, etc. According to various aspects, the band 50 is a flexible band which extends substantially around the entire circumference of the well portion 48. As described in more detail below, the band 50 includes a first end 56, a second end 58, a first band loop 60 (See FIG. 10) proximate the first end 56 and a second band loop 62 (See FIG. 10) proximate the second end 58. The first band loop 60 is coupled to the second band loop end 58 by the coupler assembly 54.

Figure 10:
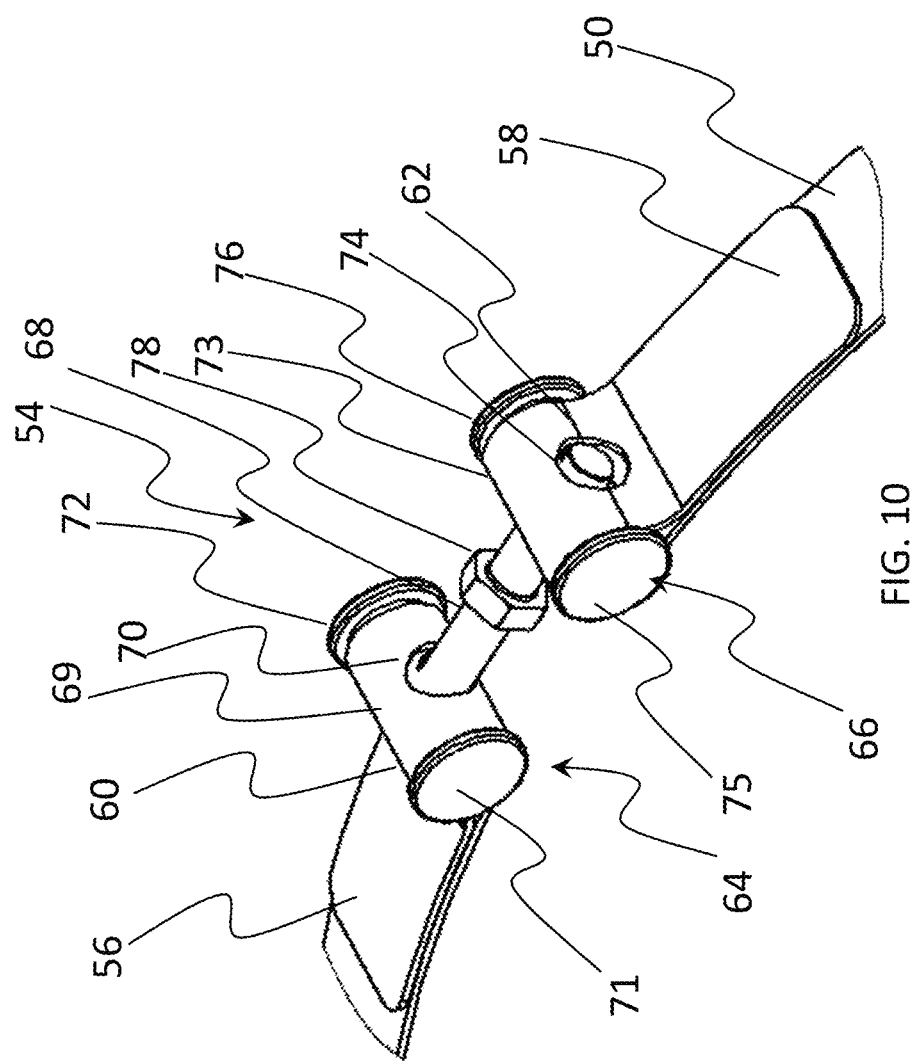
FIG. 10 illustrates various aspects of a coupler assembly of the anti-roll off assembly of FIG. 9.

FIG. 10 illustrates various aspects of the coupler assembly 54. The coupler assembly 54 is utilized to couple the first band loop 60 with the second band loop 62, and to adjust a tension force applied to the band 50 (tighten or loosen the band around the circumference of the well portion 48 of the wheel 12). The coupler assembly 54 includes a first trunnion 64, a second trunnion 66 and a threaded member 68. The first trunnion 64, the second trunnion 66 and the threaded member 68 may be fabricated from any suitable material. For example, according to various aspects, the first trunnion 64, the second trunnion 66 and the threaded member 68 include a metallic material (e.g., a stainless steel material), a polymeric material, combinations thereof, etc.

Figure 11:
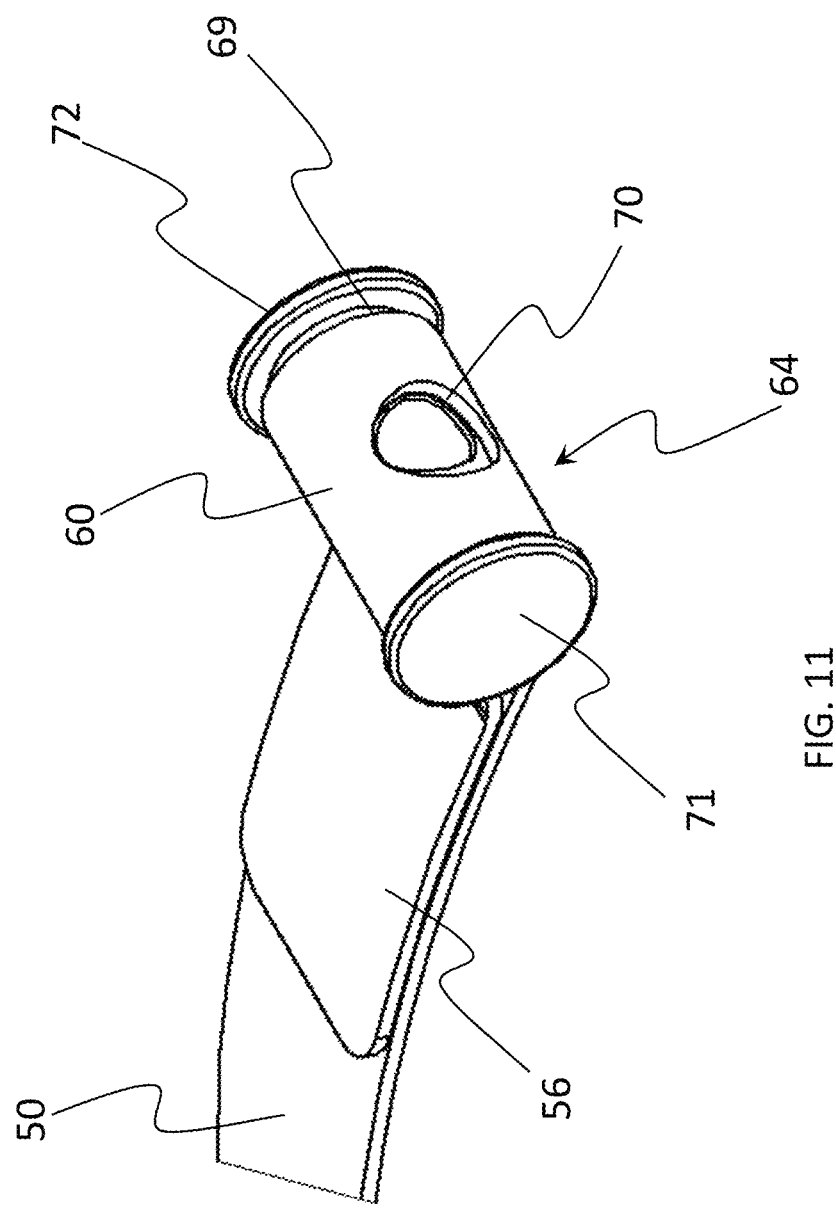
FIG. 11 illustrates various aspects of a trunnion of the coupler assembly of FIG. 10.

The first trunnion 64 includes a cylindrically shaped body member 69 having a first diameter, and defines a threaded opening 70 which extends through the first trunnion 64. The threaded opening 70 is configured to receive a first end of the threaded member 68. An exemplary view of the threaded opening 70 is shown in FIG. 11. The first trunnion 64 also includes a first circular-shaped retention edge 71 positioned at a first axial end of the body member 69 and having a second diameter. The second diameter is greater than the first diameter. The first trunnion 64 further includes a second circular-shaped retention edge 72 positioned at a second axial end of the body member 69 and having a third diameter. The third diameter is greater than the first diameter, and may be similar or identical to the second diameter. As described in more detail below, the retention edges 71, 72 operate to prevent the first band loop 60 from sliding axially off either of the two axial ends of the body member 69 of the first trunnion 64.

Similarly, the second trunnion 66 includes a cylindrically shaped body member 73 having a first diameter, and defines a threaded opening 74 which extends through the second trunnion 66. The threaded opening 74 is configured to receive a second end of the threaded member 68. The second trunnion 66 also includes a first circular-shaped retention edge 75 positioned at a first axial end of the body member 73 and having a second diameter. The second diameter is greater than the first diameter. The second trunnion 66 further includes a second circular-shaped retention edge 76 positioned at a second axial end of the body member 73 and having a third diameter. The third diameter is greater than the first diameter, and may be similar or identical to the second diameter. The retention edges 75, 76 operate to prevent the second band loop 62 from sliding axially off either of the two axial ends of the body member 73 of the second trunnion 66.

The first end of the threaded member 68 is configured to be received by and threadedly engaged with the threaded opening 70 of the first trunnion 64 and the second end of the threaded member 68 is configured to be received by and threadedly engaged with the threaded opening 74 of the second trunnion 66. The threaded member 68 operates similar to a jack screw in that rotation of the threaded member 68 in a first direction operates to tighten the band 50 by pulling the first and second trunnions 64, 66 (and by extension the first and second band loops 60, 62 wrapped around the first and second trunnions 64, 66) closer to one another, and rotation of the threaded member 68 in a second direction opposite the first direction operates to loosen the band 50 by pushing the first and second trunnions 64, 66 (and by extension the first and second band loops 60, 62 wrapped around the first and second trunnions 64, 66) away from one another. To facilitate the rotation of the threaded member 68, the threaded member 68 may include a facilitator member 78 securely fastened thereto such that rotation of the facilitator member 78 in the first direction causes rotation of the threaded member 68 in the first direction, and rotation of the facilitator member 78 in the second direction opposite the first direction causes rotation of the threaded member 68 in the second direction. As shown in FIG. 10, according to various aspects, the facilitator member 78 may be a hexagonal shaped nut or the like. Because of the two ends of the threaded fastener 68 and the respective threaded openings 70, 72 of the first and second trunnions 64, 66, it will be appreciated that coupler assembly 54 may be considered to include a double sided fastener and the tightening and loosening of the band 50 can be done at twice the speed compared to if only one end of the threaded member 68 or only one of the trunnions had a threaded opening.

Figure 12:
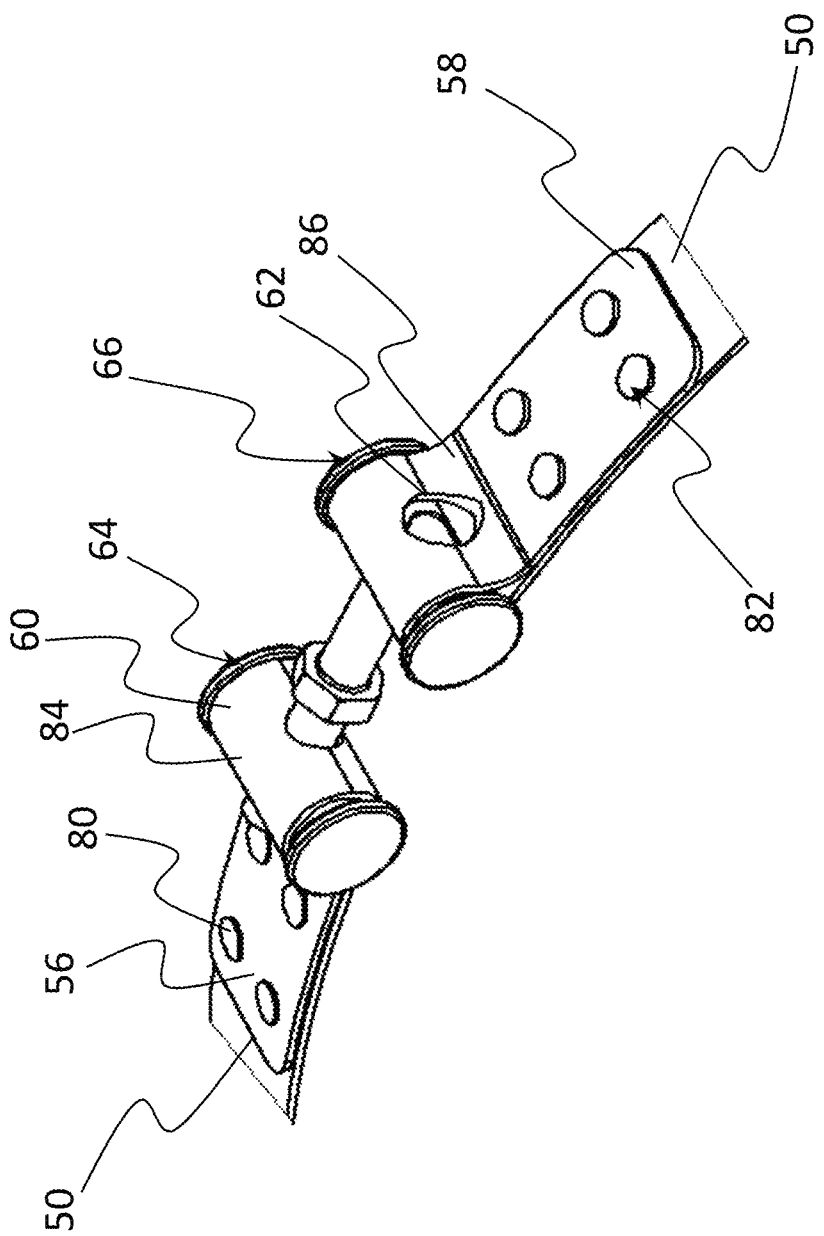
FIG. 12 illustrates various aspects of a band of the anti-roll off assembly of FIG. 9.

FIG. 12 illustrates various aspects of the band 50 proximate the first end 56 and the second end 58 of the band 50. The first band loop 60 is formed by wrapping the first end 56 of the band 50 around a circumference of the first trunnion 64, positioning the first end 56 of the band 50 to form an overlapped portion of the band 50 proximate the first trunnion 64, then attaching the first end 56 of the band 50 to the overlapped portion of the band 50 proximate the first trunnion 64. Similarly, the second band loop 62 is formed by wrapping the second end 58 of the band 50 around a circumference of the second trunnion 66, positioning the second end 58 of the band 50 to form an overlapped portion of the band 50 proximate the second trunnion 66, then attaching the second end 58 of the band 50 to the overlapped portion of the band 50 proximate the second trunnion 66. The band 50 also defines various openings and slots as described in more detail below.

The first and second ends 56, 58 of the band 50 may be attached to the respective overlapped portions of the band 50 in any suitable manner. For example, according to various aspects, the first end 56 of the band 50 is attached to the overlapped portion of the band 50 proximate the first trunnion 64 by an adhesive, by a first plurality of fasteners 80 as shown in FIG. 12, combinations thereof, or other means. The fasteners 80 may be any suitable type of fasteners. For example, according to various aspects, the fasteners 80 are spot welds. Similarly, according to various aspects, the second end 58 of the band 50 may be attached to the overlapped portion of the band 50 proximate the second trunnion 66 by an adhesive, by a second plurality of fasteners 82 as shown in FIG. 12, combinations thereof, or by other means. The second plurality of fasteners 82 may be similar or identical to the first plurality of fasteners 80, in number, relative position and relative location. Although four fasteners 80 and four fasteners 82 are shown in FIG. 12, it will be appreciated that any suitable number of fasteners in any suitable pattern and location may be utilized to fasten the first and second ends 56, 58 of the band 50 to the respective overlapped portions of the band 50.

The first band loop 60 is formed with a transition radius 84 and the second band loop 62 is formed with a transition radius 86 (which may be the same as the transition radius 84). According to various aspects, the formed transition radius 84 defines a concave surface of the band 50 and includes an embossment beginning at the tangency at the first band loop 60, between 6 and 9 o'clock when looking at the "left" side of the trunnion 64 (when facing FIG. 10). Similarly, according to various aspects, the formed transition radius 86 defines another concave surface of the band 50 and includes another embossment beginning at the tangency at the second band loop 62, between 3 and 6 o'clock when looking at the "left" side of the trunnion 66 (when facing FIG. 10). According to various aspects, the transition radius 84 is less than an inside radius of the first band loop 60 and can approach 0 radius (i.e., sharp corner) as it tangentially projects the first end 56 parallel to the band 50. Similarly, according to various aspects, the transition radius 86 is less than an inside radius of the second band loop 62 and can approach 0 radius (i.e., sharp corner) as it tangentially projects the second end 58 parallel to the band 50. With the transition radius 84 and the transition radius 86 in place, fastener torque can be increased by preventing tension on the fasteners 80, 82.

Figure 13:
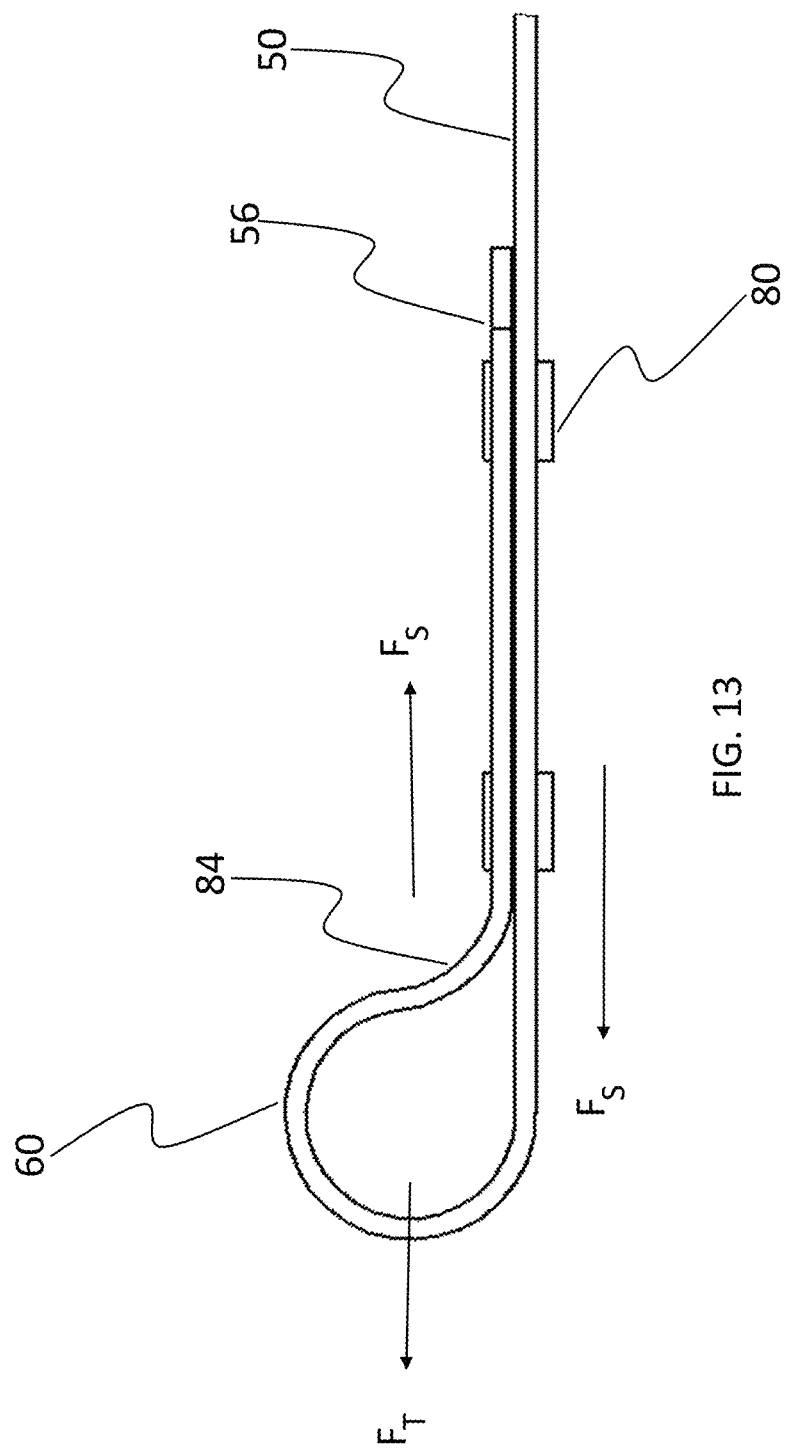
FIG. 13 illustrates various aspects of a band loop of the band of FIG. 12.

FIG. 13 illustrates various aspects of the first band loop 60 (and is also representative of the second band loop 62). The transition radius 84 of the first band loop 60 creates sheer forces ($F_S$) on the plurality of fasteners 80 associated with the first band loop 60. Similarly, although not shown, it will be appreciated the transition radius 86 of the second band loop 62 also creates sheer forces ($F_S$) on the plurality of fasteners 82 associated with the second band loop 62. The transition radius 84 and the transition radius 86 collectively allow for tension forces to be applied to the band 50 which are significantly higher than would be the case if the first and second band loops 60, 62 were formed without such transition radiuses. For example, according to various aspects, the above-described structure and arrangement of the first and second band loops 60, 62 allows for a tensioning force of up to approximately 5500 pounds-force.

Figure 14:
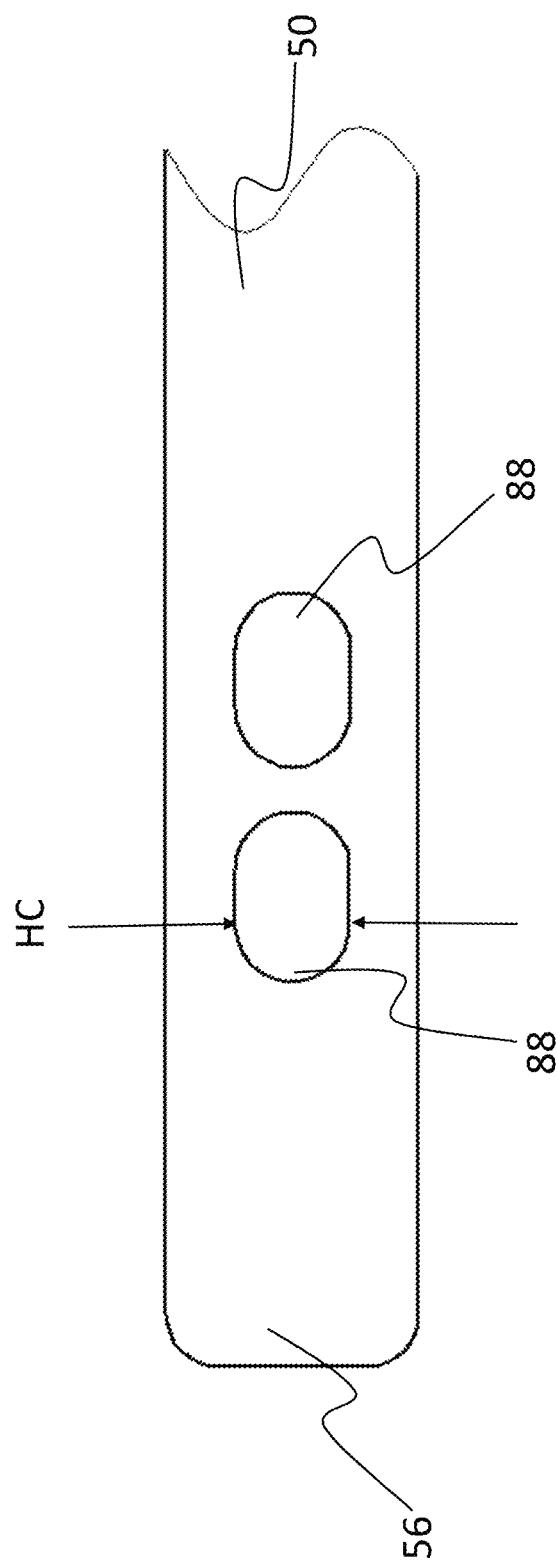
FIG. 14 illustrates other aspects of the band of the anti-roll off assembly of FIG. 9.

FIG. 14 illustrates various aspects of the band 50 proximate its first end 56. The band 50 defines two openings 88 proximate the first end 56 of the band 50. The openings 88 align with the respective ends of the threaded opening 70 of the first trunnion 64 when the band 50 is wrapped around the circumference of the first trunnion 64. Although the two openings 88 defined by the band 50 are shown as being oval in shape, it will be appreciated that according to other aspects, the two openings 88 may be circular in shape to match the threaded opening 70 and/or the cross-section of the threaded member 68 which must pass through one of the two openings 88 (i.e., the hardware clearance "HC") in order to be received by the threaded opening 70 of the first trunnion 64. For instances where a portion of the threaded member 68 passes entirely through the threaded opening 70 of the first trunnion 64, the threaded member 68 also passes through the second one of the two openings 88. As shown in FIG. 14, a width of a given one of the two openings 88 is less than 35% of an overall width of the band 50 at the location of the given opening 88, thereby allowing for the band 50 to accommodate much higher tensioning forces than if either of the two openings 88 consumed a much greater width of the band 50. It will be appreciated that the second end 58 of the band 50 may be configured in a similar or identical manner to that of the first end 56 of the band 50 (i.e., define two openings which align with the respective ends of the threaded opening 74 of the second trunnion 66 when the band 50 is wrapped around the circumference of the second trunnion 66).

Figure 15:
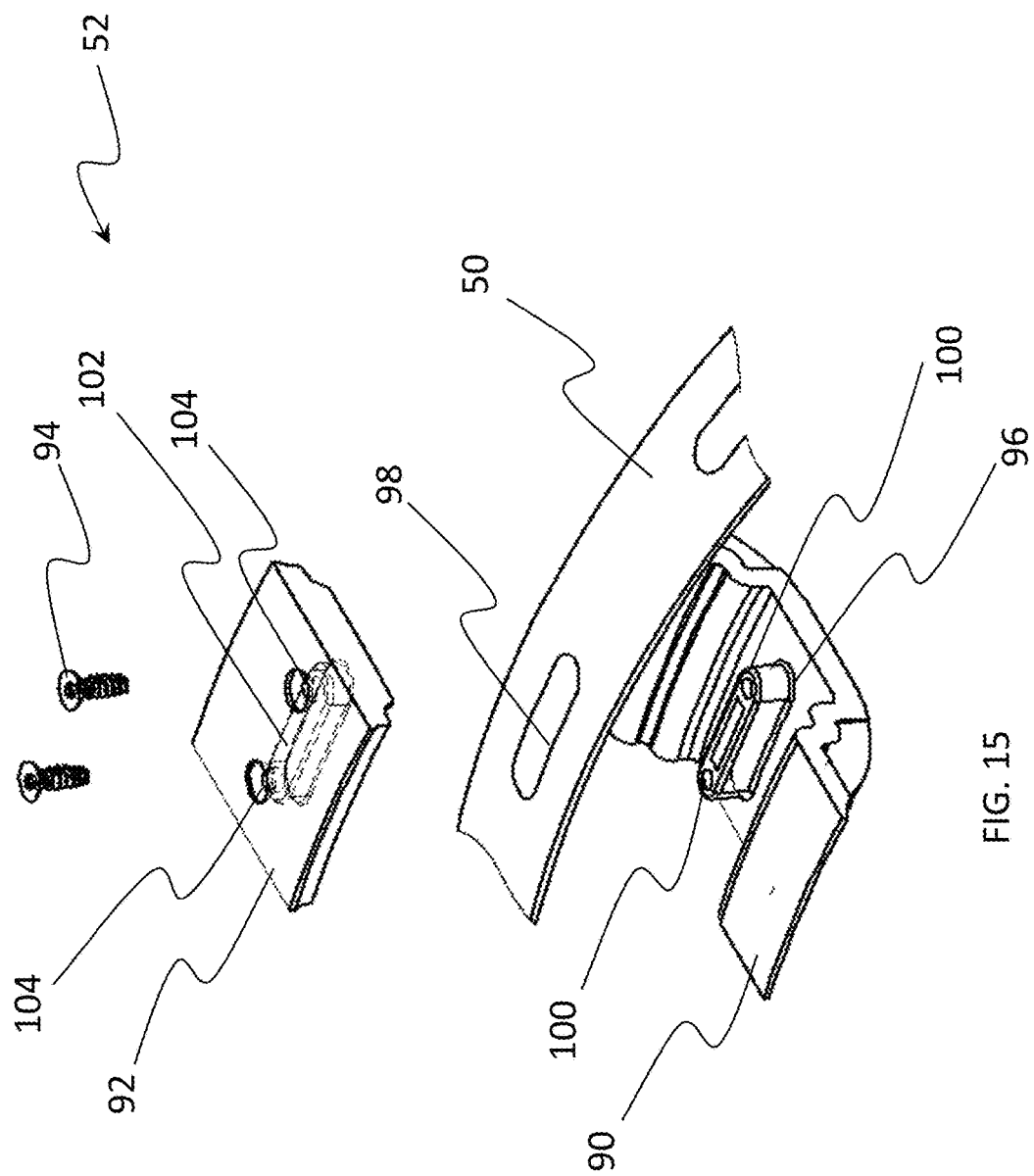
FIG. 15 illustrates an exploded view of a filler assembly of the anti-roll off assembly of FIG. 9 according to various aspects.

FIG. 15 illustrates an exploded view of a filler assembly 52 of the anti-roll off assembly 16 according to various aspects. The filler assembly 52 shown in FIG. 15 is representative of the plurality of filler assemblies 52 of the anti-roll off assembly 16. The filler assembly 52 is connected to the band 50 and includes a base member 90, a clamping member 92 and fasteners 94. According to various aspects, the band 50 forms a part of the filler assembly 52. The filler assembly 52 has a height, a width and a length, and is configured to help prevent the tire 14 from rolling off the wheel 12. According to various aspects, the height of the filler assembly 52 is equal to or greater than the height of the well portion 48 and the width of the filler assembly 52 is equal to or greater than the width of the well portion 48. As described in more detail below, the filler assembly 52 is configured to completely fill and/or block off the radial height and the axial width of the well portion 48 of the wheel 12 along a given circumferential portion of the wheel 12. Stated differently, the filler assembly 52 is configured to completely fill and/or block off a radial section of the well portion 48 associated with the filler assembly 52.

The base member 90 may be fabricated from any suitable material. For example, according to various aspects, the base member 90 includes a polymeric compound (e.g., a glass filled nylon), a metallic compound, combinations thereof, etc. The base member 90 is configured specifically for a given wheel 12 and is configured to be seated against a bottom/radially innermost surface 95 (See FIG. 16) of the well portion 48, against a first side/axially outward surface 97 (See FIG. 16) of the well portion 48 and against a second side/axially inward surface 99 (See FIG. 16) of the well portion 48. Thus, the base member 90 can be seated against multiple surfaces of the well portion 48. It will be appreciated that the axially outward side of the well portion 48 and the axially inward side of the well portion 48 may be different from one another, may be mirror images of one another, may have multiple changes in direction, etc. The unique shape of the axially outward side and the axially inward side of the base member 90, which are respectively seated against the axially outward side of the well portion 48 and the axially inward side of the well portion 48, operate to restrict rotation of the base member 90 relative to the band 50.

The base member 90 includes a positioning key 96 which extends radially outward from a radially outer surface of the base member 90 and is configured to receive and be surrounded by a slot 98 of the band 50 as shown in FIG. 15. It will be appreciated that the band 50 may define any number of such slots 98. The positioning key 96 defines two openings 100 which are configured to receive the fasteners 94. According to various aspects, the openings 100 are threaded openings. The fasteners 94 may be any suitable type of fasteners. For example, according to various aspects, the fasteners 94 are threaded fasteners such as screws. The positioning key 96 allows for incremental circumferential positioning of the base member 90 along the band 50.

The clamping member 92 may be fabricated from any suitable material. For example, according to various aspects, the clamping member 92 includes a polymeric compound (e.g., a glass filled nylon), a metallic compound, combinations thereof, etc. The clamping member 92 defines a retention cavity 102 which is configured to be received by and surround the positioning key 96. The clamping member 92 also defines two openings 104 which extend from a radially outer surface of the clamping member 92 to the retention cavity 102 and are aligned with the two openings 100 defined by the positioning key 96. When the clamping member 92 is coupled to the positioning key 96 by the fasteners 94, (which pass through the openings 104 and are received by the openings 100), the band 50 is sandwiched between the clamping member 92 and the base member 90. According to various aspects, the base member 90 and the clamping member 92 cooperate to completely fill and/or block off the radial height and axial width of the well portion 48 of the wheel 12 along a given circumferential portion of the wheel 12 (completely fill and/or block off a radial section of the well portion 48 associated with the base member 90/clamping member 94 combination). The positioning key 96 operates to prevent the clamping member 92 from moving axially or circumferentially, and the two fasteners 94 prevent the clamping member 92 from moving radially relative to the base member 90.

With the band 50 positioned around the positioning key 96 and the clamping member 92 secured to the base member 90, the band 50 is connected to the filler assembly 52 by a double shear connection which for all practical purposes eliminates any slippage of the filler assembly 52 along the band 50. Potential slipping of the filler assembly 52 along the band 50 is also mitigated by the friction created when the band 50 is secured between the base member 90 and the clamping member 92 as the fasteners 94 are tightened.

Figure 16:
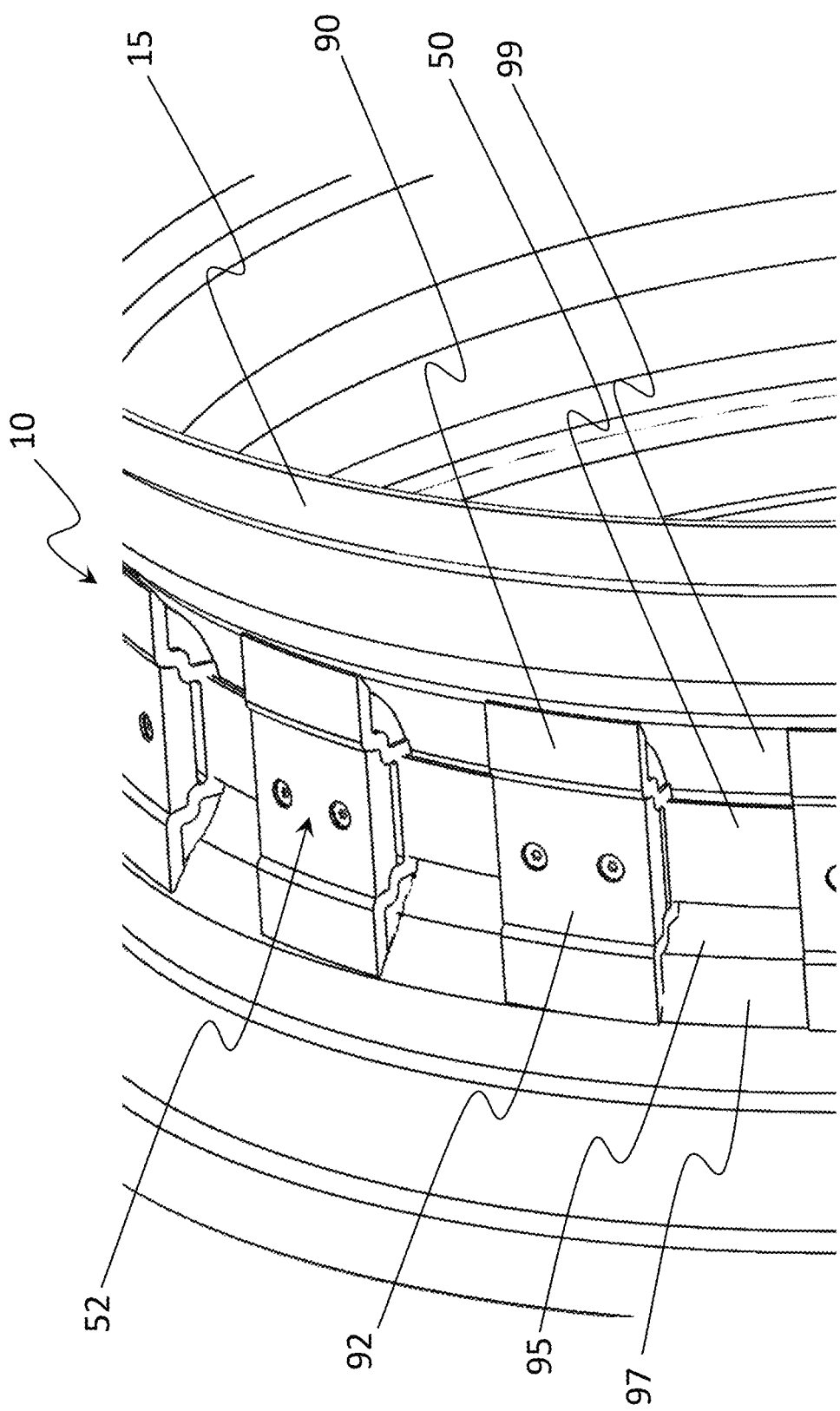
FIG. 16 illustrates a partial perspective view of the system of FIG. 6 according to various aspects.

FIG. 16 illustrates a partial perspective view of the system 10 according to various aspects. As shown in FIG. 16, a plurality of the filling assemblies 52 are fitted into the well portion 48 of the wheel 12. For purposes of clarity, the tire 14 is not shown. As described above, the respective base members 90 are configured to be an exact fit of the axial width and radial depth of the well portion 48 of a given wheel 12 and the respective filler assemblies 52 are configured to completely fill and/or block off the volume of the well portion 48 along given circumferential portions of the wheel 12 (completely fill and/or block off respective radial sections of the well portion 48 associated with the respective filler assemblies 52). By being configured in this manner, the filler assemblies 52 are able to (1) prevent the first bead portion 30 and/or the second bead portion 32 of the tire 14 from entering the well portion 48 and the tire 14 from rolling off the wheel 12, (2) distribute high loads caused by axial movement of the first bead portion 30 and/or the second bead portion 32 across the well portion 48 along the radially outer surface of the clamping member 92 and (3) support vehicle loads ranging up to approximately 7400 pounds.

EXAMPLES

Example 1

A system is provided. The system comprises a one-piece wheel, a tire mounted to the wheel, and an anti-roll off assembly. The wheel defines an axis of rotation and comprises a disc portion which defines a central opening, and a rim portion which is connected to the disc portion and defines first and second flange portions, first and second seat portions and a well portion. The anti-roll off assembly is positioned in the well portion and comprises a band, a plurality of filler assemblies connected to the band and a coupler assembly configured to adjust a tension force applied to the band. The coupler assembly comprises a first trunnion in contact with the band and having a first threaded opening, a second trunnion in contact with the band and having a second threaded opening, and a threaded member having a first end threadedly engaged with the first threaded opening and a second end threadedly engaged with the second threaded opening.

Example 2

The system of Example 1, wherein the band defines a plurality of slots along a length of the band.

Example 3

The system of Examples 1 or 2, wherein the band further defines first and second openings proximate a first end of the band, wherein at least one of the first and second openings is aligned with the first threaded opening of the first trunnion.

Example 4

The system of Example 3, wherein a width of at least one of the first and second openings is less than 35% of an overall width of the band.

Example 5

The system of Examples 1, 2, 3 or 4, wherein the band comprises a first end of the band, wherein the first end overlaps and is attached to a different portion of the band, and a band loop proximate the first end of the band, wherein the band loop defines an inside radius.

Example 6

The system of Examples 5, wherein the band defines a transition radius between the band loop and the first end of the band, wherein the transition radius is less than the inside radius defined by the band loop.

Example 7

The system of Example 6, wherein the band comprises a flexible band.

Example 8

The system of Examples 1, 2, 3, 4, 5, 6 or 7, wherein at least one of the plurality of filler assemblies comprises (1) a base member seated against multiple surfaces of the well portion, wherein the base member defines a positioning key surrounded by a slot defined by the band, and (2) a clamping member connected to the base member, wherein the clamping member defines a retention cavity which surrounds the positioning key, wherein the at least one of the plurality of filler assemblies completely blocks off a radial segment of the well portion.

Example 9

The system of Examples 1, 2, 3, 4, 5, 6, 7 or 8, wherein the at least one of the plurality of filler assemblies further comprises a pair of fasteners which connect the clamping member to the base member.

Example 10

The system of Examples 1, 2, 3, 4, 5, 6, 7, 8 or 9, wherein wherein the first trunnion comprises (1) a cylindrical-shaped body member having a first diameter, (2) a first circular-shaped retention edge connected to a first end of the cylindrical-shaped body, wherein the first circular-shaped retention edge has a second diameter which is greater than the first diameter, and (3) a second circular-shaped retention edge connected to a second end of the cylindrical-shaped body member, wherein the second circular-shaped retention edge has a third diameter which is greater than the first diameter.

Example 11

The system of Example 10, wherein the cylindrical-shaped body member is surrounded by a band loop defined by the band.

Example 12

The system of Examples 1, 2, 3, 4, 5, 6, 7, 8, 9, 10 or 11, wherein the second trunnion comprises (1) a second cylindrical-shaped body member having a fourth diameter, (2) a third circular-shaped retention edge connected to a first end of the second cylindrical-shaped body, wherein the third circular-shaped retention edge has a fifth diameter which is greater than the fourth diameter, and (3) a fourth circular-shaped retention edge connected to a second end of the second cylindrical-shaped body member, wherein the fourth circular-shaped retention edge has a sixth diameter which is greater than the fourth diameter.

Example 13

The system of Example 12, wherein the second cylindrical-shaped body member is surrounded by a second band loop defined by the band.

Example 14

The system of Examples 1, 2, 3, 4, 5, 6, 7, 8, 9, 10, 11, 12 or 13, wherein the coupler assembly further comprises a facilitator member connected to the threaded member.

Example 15

An anti-roll off assembly is provided. The anti-roll off assembly comprises (1) a band configured to extend substantially around an entire circumference of a well portion of a one-piece wheel, (2) a plurality of filler assemblies connected to the band, wherein at least one of the filler assemblies is configured to completely block off a radial segment of the well portion, and (3) a coupler assembly configured to adjust a tension force applied to the band, wherein the coupler assembly comprises (i) a first trunnion in contact with the band and having a first threaded opening, (ii) a second trunnion in contact with the band and having a second threaded opening, and (iii) a threaded member comprising a first end threadedly engaged with the first threaded opening and a second end threadedly engaged with the second threaded opening.

Although the various aspects of the system have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system, comprising:
    a one-piece wheel, wherein the wheel defines an axis of rotation and comprises:
        a disc portion which defines a central opening; and
        a rim portion connected to the disc portion, wherein the rim portion defines:
            first and second flange portions;
            first and second seat portions; and
            a well portion;
    a tire mounted to the wheel; and
    an anti-roll off assembly positioned in the well portion, wherein the anti-roll off assembly comprises:
        a band, wherein the band comprises:
            a first end, wherein the first end of the band overlaps and is attached to a different portion of the band; and
            a band loop proximate the first end of the band, wherein the band loop defines an inside radius;
            wherein the band defines a transition radius between the band loop and the first end of the band, wherein the transition radius is less than the inside radius defined by the band loop;
        a plurality of filler assemblies connected to the band; and
        a coupler assembly configured to adjust a tension force applied to the band, wherein the coupler assembly comprises:
            a first trunnion in contact with the band and having a first threaded opening;
            a second trunnion in contact with the band and having a second threaded opening; and
            a threaded member comprising a first end threadedly engaged with the first threaded opening and a second end threadedly engaged with the second threaded opening.

2. The system of claim 1, wherein the band defines a plurality of slots along a length of the band.

3. The system of claim 2, wherein the band further defines first and second openings proximate a first end of the band, wherein at least one of the first and second openings is aligned with the first threaded opening of the first trunnion.

4. The system of claim 3, wherein a width of at least one of the first and second openings is less than 35% of an overall width of the band.

5. The system of claim 1, wherein the band comprises a flexible band.

6. The system of claim 1, wherein at least one of the plurality of filler assemblies comprises:
    a base member seated against multiple surfaces of the well portion, wherein the base member defines a positioning key surrounded by a slot defined by the band; and
    a clamping member connected to the base member, wherein the clamping member defines a retention cavity which surrounds the positioning key, wherein the at least one of the plurality of filler assemblies completely blocks off a radial segment of the well portion.

7. The system of claim 6, wherein the at least one of the plurality of filler assemblies further comprises a pair of fasteners which connect the clamping member to the base member.

8. The system of claim 1, wherein the first trunnion comprises:
    a cylindrical-shaped body member having a first diameter;
    a first circular-shaped retention edge connected to a first end of the cylindrical-shaped body, wherein the first circular-shaped retention edge has a second diameter which is greater than the first diameter; and
    a second circular-shaped retention edge connected to a second end of the cylindrical-shaped body member, wherein the second circular-shaped retention edge has a third diameter which is greater than the first diameter.

9. The system of claim 8, wherein the cylindrical-shaped body member is surrounded by a band loop defined by the band.

10. The system of claim 8, wherein the second trunnion comprises:
   a second cylindrical-shaped body member having a fourth diameter;
   a third circular-shaped retention edge connected to a first end of the second cylindrical-shaped body, wherein the third circular-shaped retention edge has a fifth diameter which is greater than the fourth diameter; and
   a fourth circular-shaped retention edge connected to a second end of the second cylindrical-shaped body member, wherein the fourth circular-shaped retention edge has a sixth diameter which is greater than the fourth diameter.

11. The system of claim 10, wherein the second cylindrical-shaped body member is surrounded by a second band loop defined by the band.

12. The system of claim 1, wherein the coupler assembly further comprises a facilitator member connected to the threaded member.

13. An anti-roll off assembly, comprising:
   a band configured to extend substantially around an entire circumference of a well portion of a one-piece wheel, wherein the band comprises:
     a first end, wherein the first end of the band overlaps and is attached to a different portion of the band; and
     a band loop proximate the first end of the band, wherein the band loop defines an inside radius;
     wherein the band defines a transition radius between the band loop and the first end of the band, wherein the transition radius is less than the inside radius defined by the band loop;
   a plurality of filler assemblies connected to the band, wherein at least one of the filler assemblies is configured to completely block off a radial segment of the well portion; and
   a coupler assembly configured to adjust a tension force applied to the band, wherein the coupler assembly comprises:
     a first trunnion in contact with the band and having a first threaded opening;
     a second trunnion in contact with the band and having a second threaded opening; and
     a threaded member comprising a first end threadedly engaged with the first threaded opening and a second end threadedly engaged with the second threaded opening.

14. A system, comprising:
   a one-piece wheel, wherein the wheel defines an axis of rotation and comprises:
     a disc portion which defines a central opening; and
     a rim portion connected to the disc portion, wherein the rim portion defines:
       first and second flange portions;
       first and second seat portions; and
       a well portion;
   a tire mounted to the wheel; and
   an anti-roll off assembly positioned in the well portion, wherein the anti-roll off assembly comprises:
     a band;
     a plurality of filler assemblies connected to the band; and
     a coupler assembly configured to adjust a tension force applied to the band, wherein the coupler assembly comprises:
       a trunnion in contact with the band, wherein the trunnion comprises:
         a first threaded opening;
         a cylindrical-shaped body member having a first diameter, wherein the cylindrical-shaped body member is surrounded by a band loop defined by the band;
         a first circular-shaped retention edge connected to a first end of the cylindrical-shaped body, wherein the first circular-shaped retention edge has a second diameter which is greater than the first diameter; and
         a second circular-shaped retention edge connected to a second end of the cylindrical-shaped body member, wherein the second circular-shaped retention edge has a third diameter which is greater than the first diameter;
       a second trunnion in contact with the band and having a second threaded opening; and
       a threaded member comprising a first end threadedly engaged with the first threaded opening and a second end threadedly engaged with the second threaded opening.

15. An anti-roll off assembly, comprising:
   a band configured to extend substantially around an entire circumference of a well portion of a one-piece wheel;
   a plurality of filler assemblies connected to the band, wherein at least one of the filler assemblies is configured to completely block off a radial segment of the well portion; and
   a coupler assembly configured to adjust a tension force applied to the band, wherein the coupler assembly comprises:
     a first trunnion in contact with the band, wherein the first trunnion comprises:
       a first threaded opening;
       a cylindrical-shaped body member having a first diameter, wherein the cylindrical-shaped body member is surrounded by a band loop defined by the band;
       a first circular-shaped retention edge connected to a first end of the cylindrical-shaped body, wherein the first circular-shaped retention edge has a second diameter which is greater than the first diameter; and
       a second circular-shaped retention edge connected to a second end of the cylindrical-shaped body member, wherein the second circular-shaped retention edge has a third diameter which is greater than the first diameter;
     a second trunnion in contact with the band and having a second threaded opening; and
     a threaded member comprising a first end threadedly engaged with the first threaded opening and a second end threadedly engaged with the second threaded opening.

* * * * *